United States Patent [19]

Stephens

[11] Patent Number: 5,022,052
[45] Date of Patent: Jun. 4, 1991

[54] ANALOG SIGNAL BINARY TRANSMISSION SYSTEM USING SLOPE DETECTION

[75] Inventor: H. Bruce Stephens, Tulsa, Okla.

[73] Assignee: Seismograph Service Corp., Tulsa, Okla.

[21] Appl. No.: 121,508

[22] Filed: Nov. 13, 1987

[51] Int. Cl.$^5$ .................................................. H04B 14/04
[52] U.S. Cl. .................................... 375/25; 328/114; 341/129
[58] Field of Search .................. 375/21, 22, 23, 24, 375/25, 28; 370/8, 9; 341/126, 127, 128, 166, 167, 168, 129; 329/312, 313; 332/109; 328/111, 114; 307/234

[56] References Cited

U.S. PATENT DOCUMENTS

| | | | |
|---|---|---|---|
| 3,206,681 | 9/1965 | Brown | 375/25 |
| 3,369,182 | 2/1968 | Reindl | 375/25 |
| 3,599,203 | 8/1971 | Conley | 341/167 |
| 3,688,260 | 8/1972 | Jensen et al. | 329/106 |
| 3,749,834 | 7/1973 | Ellis | 329/312 |
| 3,749,894 | 7/1973 | Audeef | 341/167 |
| 3,937,897 | 2/1976 | Song | 375/28 |
| 4,034,294 | 7/1977 | Dalley | 375/25 |
| 4,122,300 | 10/1978 | Busigny et al. | 375/28 |
| 4,404,545 | 9/1983 | Nakanishi et al. | 341/128 |
| 4,497,060 | 1/1985 | Yang | 329/106 |
| 4,535,294 | 8/1985 | Ericksen et al. | 375/76 |
| 4,584,566 | 4/1986 | Arcara | 341/128 |
| 4,622,586 | 11/1986 | Megeid | 455/608 |
| 4,649,550 | 3/1987 | Mount | 375/37 |
| 4,692,719 | 9/1987 | Whigham | 375/28 |

Primary Examiner—Stephen Chin
Attorney, Agent, or Firm—Denis G. Maloney; Richard M. Sharkansky

[57] ABSTRACT

A system for transmitting an analog signal comprises converting the input analog signal to a binary signal by detecting the change in sign of the slope of the analog signal and generating a binary signal whose transition occurs at each change of sign of slope of the analog signal. In a preferred embodiment of the invention, the binary signal is transmitted as an amplitude modulation on a carrier frequency over a fiberoptic line to a receiver. The receiver converts the detected binary signal into an analog signal by binary signal gating of a clock signal into an up/down counter whose digital output is converted to an analog signal which is filtered to remove the clock frequency and harmonics of the highest desired input signal frequency thereby providing a replica of the input analog signal. Multiple input signals may be multiplexed and their digital outputs processed in a computer to extract information as in seismographic exploration.

10 Claims, 5 Drawing Sheets

ANALOG SIGNAL BINARY TRANSMISSION SYSTEM USING SLOPE DETECTION

BACKGROUND OF THE INVENTION

This invention relates to a data transmission system and more particularly to a transmission system for transmitting an analog signal whose change of slope is provided as a binary signal to a transmitter for transmission over a transmission medium to a receiver where the binary signal is reconstituted as a replica of the original analog signal.

This invention is particularly suited to the seismic recording technique utilized in geophysical exploration. Prior art techniques either digitize a voltage detected by a geophone which is sent to a recording truck over a transmission line or the analog data generated by the hydrophone is transmitted to the recording truck where it is digitized. In both these prior art techniques, it is customary to use a separate transmission cable between each hydrophone and the recording truck. Since recordings are generally made from a large number of geophones spaced from each other by large distances, laying of the cables between the recording truck and the geophones is burdensome, time consuming, and hence expensive.

Current seismic recording systems acquire full precision amplitude data from many listening (geophone) stations at high sample rates. This volume of data is then transferred onto magnetic media for post-processing. The high cost and great complexity of this type of equipment is well known in the seismic acquisition business.

Several years ago, a new recording method was developed which required only the sign bit of the geophone station to be recorded. This method was proved to be geophysically valid, and in some geographic areas it was shown to produce superior results. The sign bit recording allowed the complexity of the recording system to be drastically reduced since only a single bit was required per geophone station instead of the usual 16 to 22 bits for full amplitude precision. This prior art sign bit recording was essentially hard limiting of the analog signal so that the polarity of the bit was determined by the polarity of the analog signal.

The method of the invention also uses a single bit from the geophone station. However, in contrast to the sign bit recording, the method of the invention produces a bit whose sign is determined by the sign of the slope of the analog signal rather than whether it is a positive or a negative amplitude. The method of the invention provides additional information describing the input signal waveform. In common with the prior art sign bit recording, the cost and complexity of the acquisition system is greatly reduced from that of other prior art systems. In particular, the method of the invention reduces the volume of data transferred from the listening point to the recording system. As a direct biproduct, the complexity as well as the cost of the acquisition equipment is greatly reduced.

With a simple listening station as in this invention, the electronics can be allowed to run continuously. This removes the complex control normally required for commands and control and allows sampling rates to be determined by the acquisition system. The method of the invention is suitable for signals in the low frequency range (1 to 500 Hz) which is the frequency range typical of seismic recording signals. The method also assumes a sinusoidal waveform superimposed upon lower frequency sinusoidal waveforms. The invention is capable of high density (+1000 channels), and high sample rates (10,000 Hz). The invention would make possible environmental studies requiring high density, high frequency, shallow surveys. The invention is also suitable for the excavation market for quick sub-surface measurements.

SUMMARY OF THE INVENTION

The aforementioned problems are overcome and other objects and advantages of data transmission are provided by a system, in accordance with the invention, which comprises converting the analog signal to a binary signal by detecting the change in sign of the slope of the analog signal and generating a binary signal whose transition occurs at each change of sign of slope of the analog signal. In a preferred embodiment of the invention, the binary signal is transmitted as an amplitude modulation on a carrier frequency over a fiberoptic line to a receiver. The receiver converts the detected binary signal into an analog signal by binary signal gating of a clock signal into an up/down counter whose digital output is converted to an analog signal which is filtered to remove the clock frequency and harmonics of the highest desired input signal frequency thereby providing a replica of the input analog signal. Multiple input signals may be multiplexed and their digital outputs processed in a computer to extract information as in seismographic exploration.

BRIEF DESCRIPTION OF THE DRAWINGS

The aforementioned features of the invention will become apparent from the following description taken in conjunction with the accompanying drawings wherein.

DESCRIPTION OF THE PREFERRED EMBODIMENT

Figure 1:
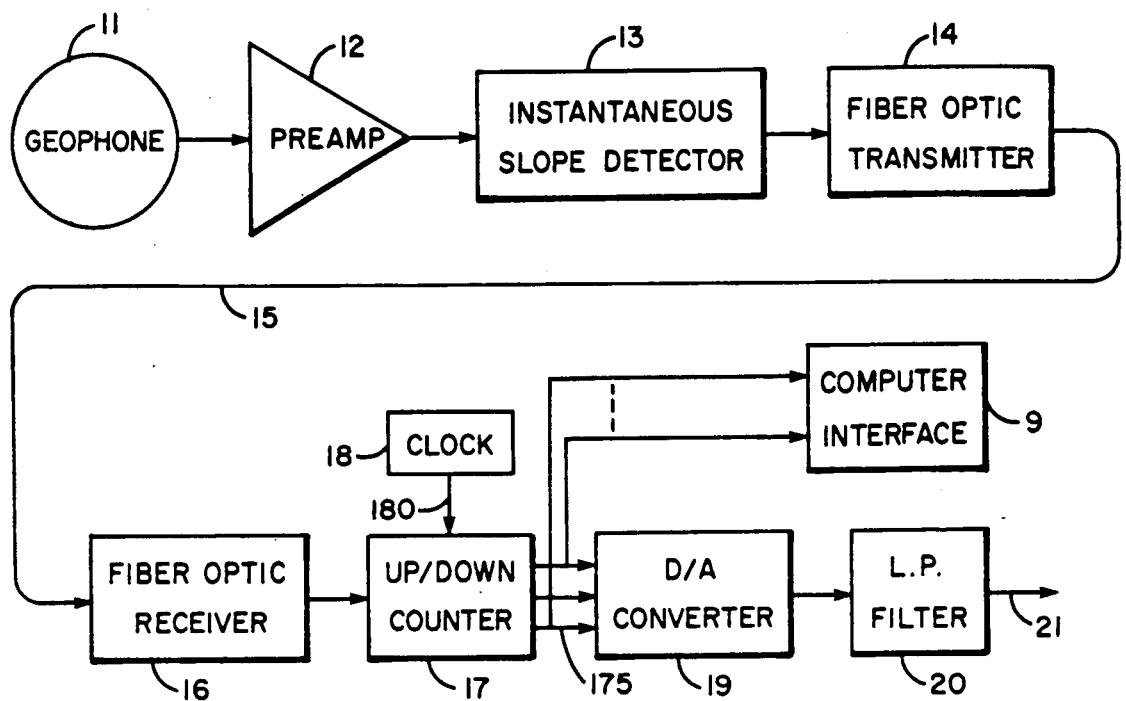
FIG. 1 is a block diagram of a preferred embodiment of this invention.
Figure 2:
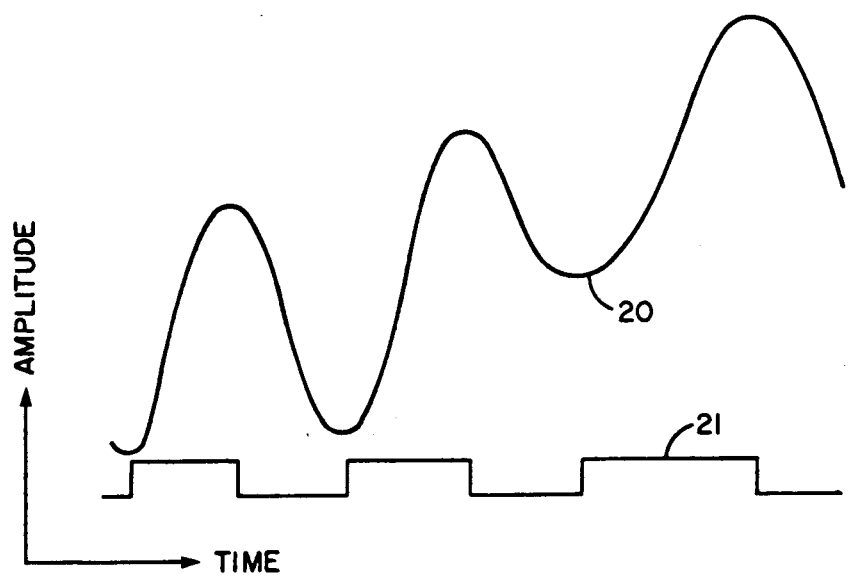
FIG. 2 shows the relationship between a binary signal and the change in slope of an analog signal.
Figure 3:
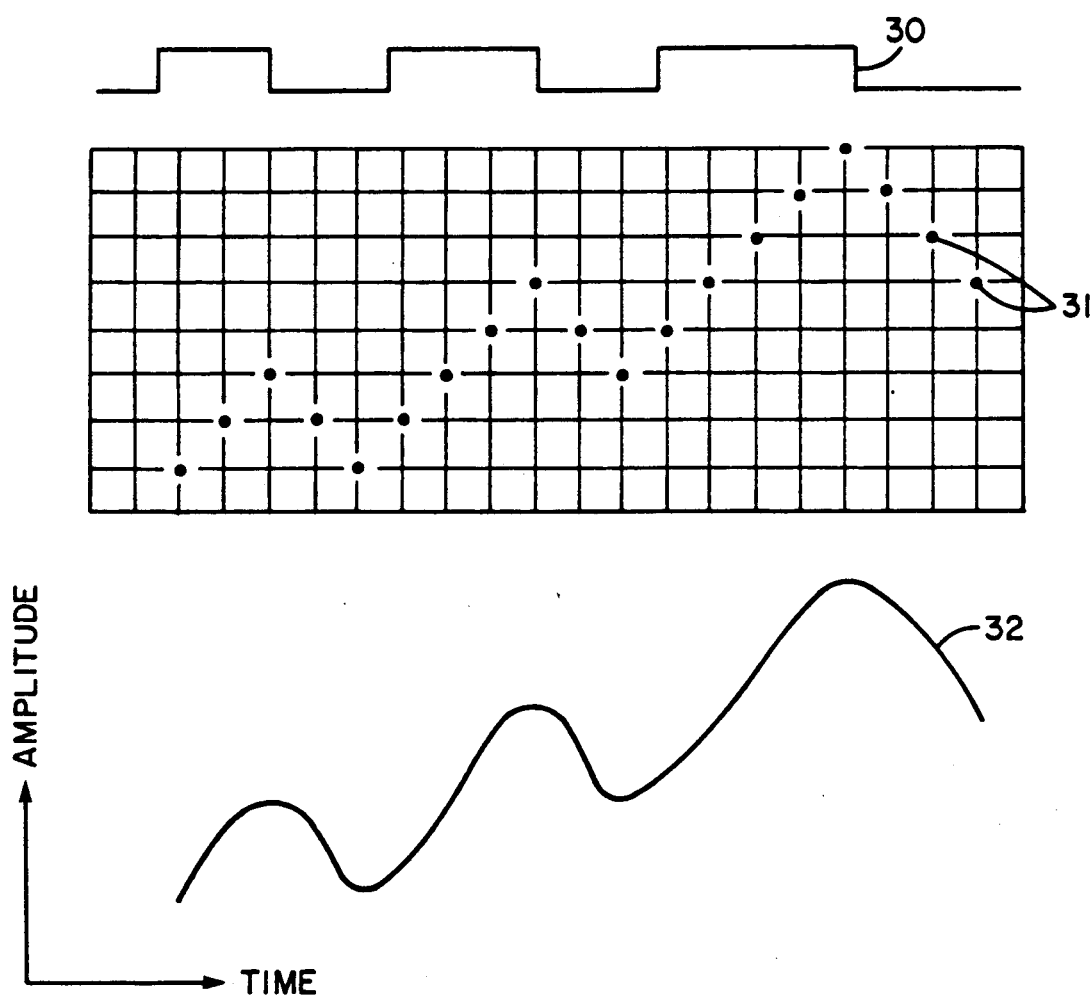
FIG. 3 shows the received binary signal, discrete analog values resulting from the binary signal, and a filtered analog signal resulting therefrom.

Referring now to FIG. 1, there is shown a block diagram of the signal transmission system 10 of this invention. A source of analog audio frequency signals is provided by a geophone 11 which is sensitive to seismic vibrations produced by a source such as those used in geophysical exploration. The analog signal provided by geophone 11 is normally of low amplitude and is amplified in preamplifier 12 before being provided to the instantaneous slope detector 13. A representative signal provided by amplifier 12 is shown as waveform 20 on the amplitude versus time in display of FIG. 2. The slope detector 13, which may be a simple differentiator or a voltage comparator as described later, translates the regions of positive slope of the signal 20 into a digital "on" and a negative slope into a digital "off". The digital signal 21 produced by the slope detector 13 is shown in FIG. 1 where the transitions of the digital signal occur at the points of zero slope of the analog signal 20. The frequency of the analog signal waveform 20 is assumed to be low, in the range of 1 to 500 Hz, which is typical of seismic recording requirements, and therefore the frequency of the digital signal is no higher than the highest analog frequency. Preferably, the slope generator 13 is a low power circuit capable of being powered from solar cells or a small rechargeable battery for field operation. The slope generator 13 would run continuously, and there need be no external commands or controls necessary for operation. The digital signal provided by slope detector 13 is provided as an amplitude modulation signal to a fiberoptic transmitter 14 which provides a carrier frequency within the transmission band of the fiberoptic cable 14 to which the transmitter output is connected. The cable 15 may extend several thousand feet to a recording truck which contains a fiberoptic receiver 16. Both the fiberoptic transmitter and the fiberoptic receiver are commercially available. The output of the receiver 16 is provided as a gate input to an up/down counter 17 which has a relatively high frequency clock pulse applied to it from clock 18. The polarity of the digital signal provided by receiver 16, which demodulates the carrier frequency transmitted over cable 15, determines whether the clock 18 causes the counter 17 to count up or down, respectively. The detected digital signal provided by the receiver 16 is shown as waveform 30 on FIG. 3 in which the amplitude versus time is shown. The count provided by the up/down counter 17 is shown as curve 31 on FIG. 3. Curve 31 shows the count of counter 17 to increase during the time corresponding to the input signal 30 being in the high condition and to decrease when the input signal is in the low state. The digital signal output from counter 17 is provided to the digital to analog converter 19 whose output is filtered in low-pass filter 20 which allows all the frequencies provided by geophone 11 to be provided at its output 21 while filtering out those frequency components produced by the clock 18. Curve 32 shows the analog signal at the output line 21 of filter 20 to be a replica of the analog signal produced by geophone 11. The digital signal from the up/down counter 17 is also provided to a computer interface for storage of the digital data for subsequent calculations using computer algorithm known to those skilled in the art for extracting useful information from the geophone data.

Figure 4:
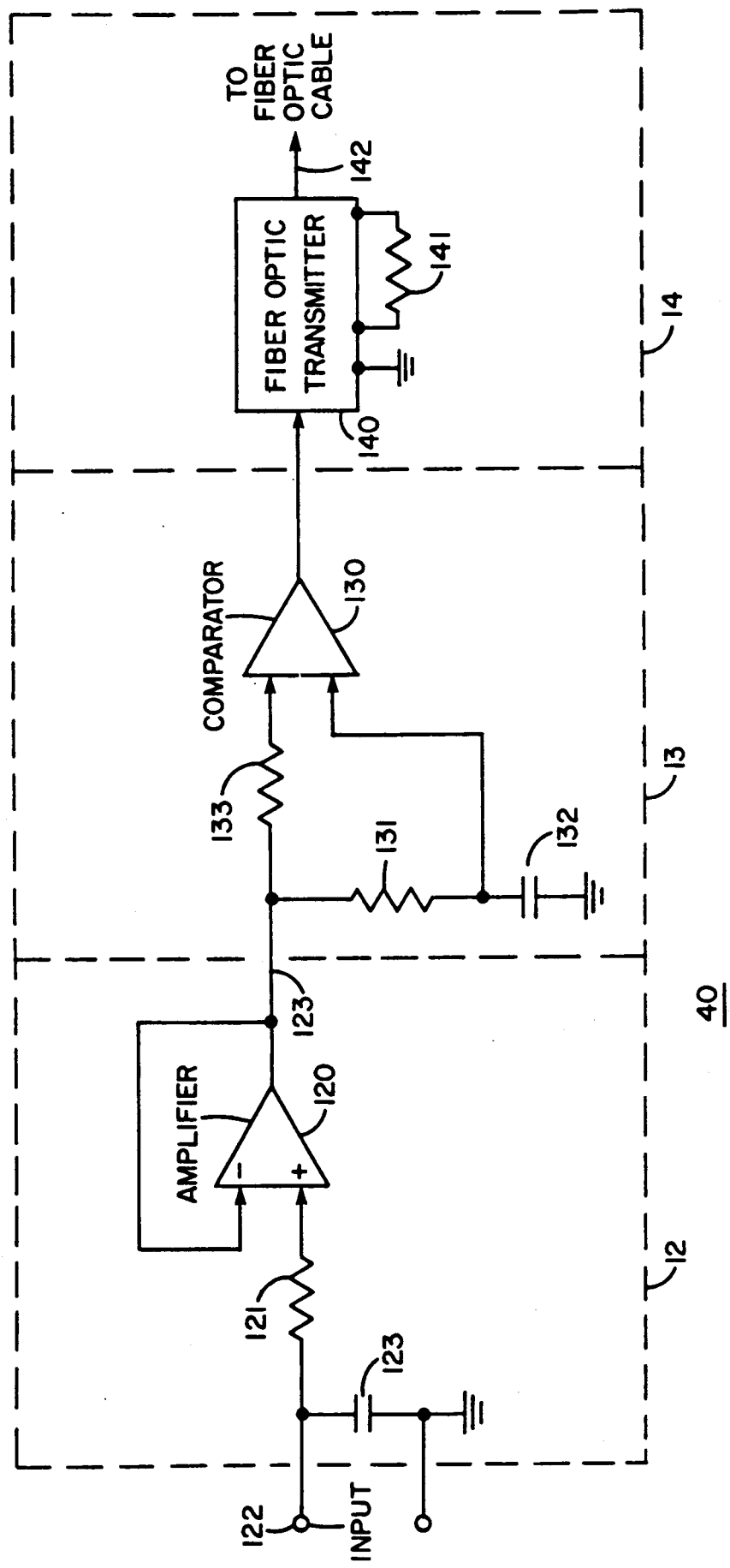
FIG. 4 is a schematic diagram of an embodiment of a binary signal transmitter.

FIG. 4 shows a detailed schematic of an embodiment of the transmitter system 40 connected between the geophone 11 and the fiberoptic cable 15 in FIG. 1. The preamplifier 12 comprises an operational amplifier 120 whose positive input is isolated by a resistor 121 from the input 122 of the amplifier 12. Input 122 has a capacitor 123 connected to ground to filter out the higher frequency components which are produced by the geophone which are not of interest. The output of the operational amplifier 120 is connected to a negative input to provide negative feedback and stability to the gain of the amplifier 120. The line 123 is connected to the output of amplifier 120 and to the input of slope detector 13. Slope detector 13 comprises an integrated circuit voltage comparator 130, typically an LM314, having two inputs connected to the line 123. One input is connected to line 123 through a phase delay network comprising resistor 131 and capacitor 132. The other input of voltage comparator 130 is connected to line 123 through a resistor 133 which produces no phase delay. As a consequence, the two signals applied to the inputs of comparator 130 are caused to be slightly out of phase which causes a transition in the ratio of the magnitudes of the inputs to occur at the region of 0 slope of the signal on line 123. The output line 134 of comparator 130 thus provides a digital signal 21 of FIG. 2 as an input signal to the fiberoptic transmitter 14 which may be a commercially available transmitter 140 of the type 37131 having a resistor 141 which controls the carrier frequency provided on its output 142 which is adapted to couple to a fiberoptic cable, the carrier frequency being modulated with the input digital signal on line 134.

Figure 5:
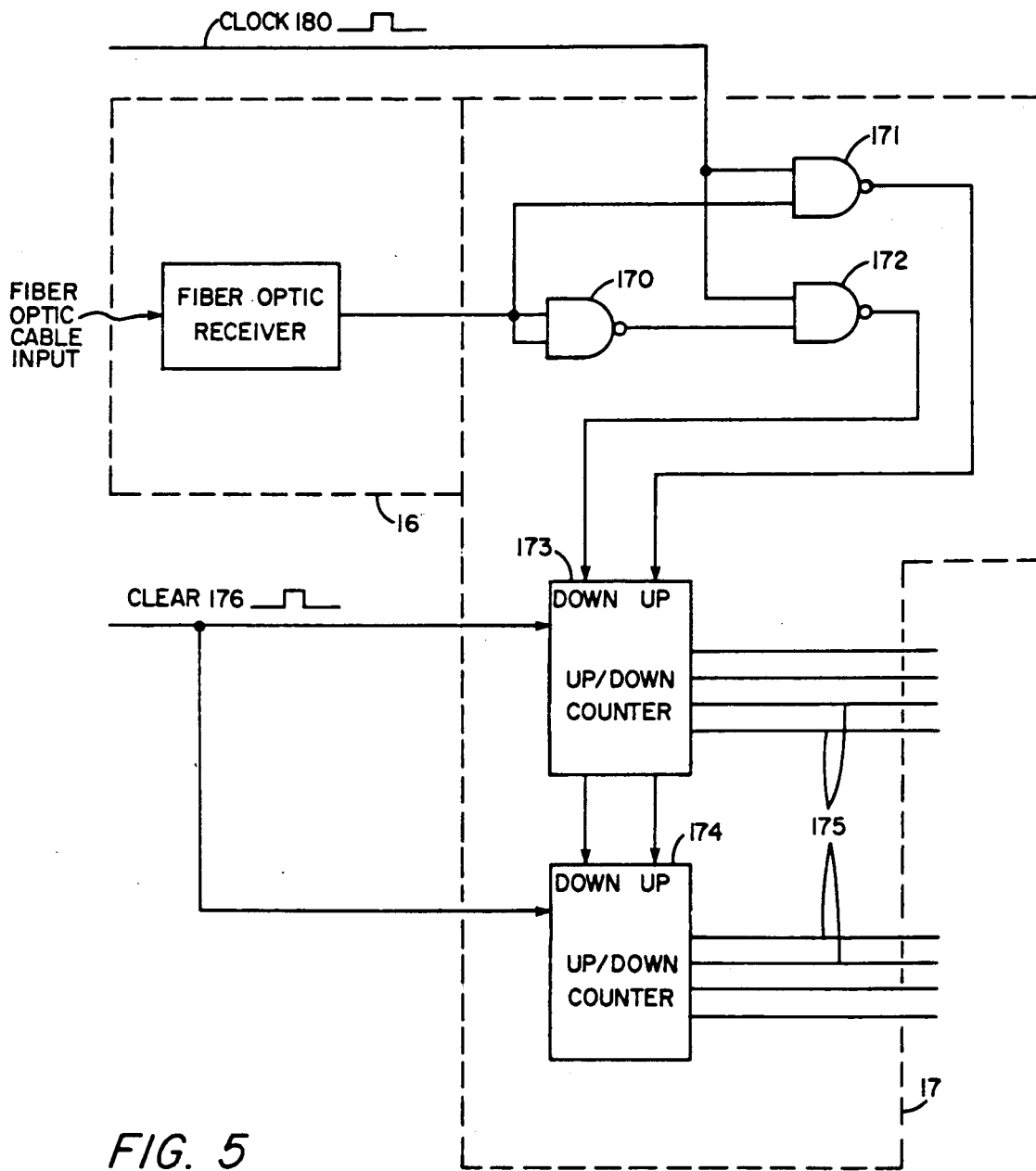
FIG. 5 is a schematic diagram of a receiver providing a digital signal from a binary modulated transmitted signal.

A block diagram of a prototype receiver 16 and an up/down counter 17 is shown in FIG. 5. The fiberoptic receiver, typically a commercially available type 376R, has its input connected to the fiberoptic cable 15 and its output to the up/down counter 17. Up/down counter 17 comprises NAND circuits 170, 171, 172. The input and output of NAND circuit 170 is provided as one input of NAND circuit 171, 172, respectively. The other input to NAND circuits 171, 172 is the clock signal on line 180. Thus, the digital input provided by receiver 16 to NAND circuit 170 causes clock pulses to appear at the down terminal or the up terminal of counter 173, depending upon the state of gate circuits 171, 172. The borrow and carry outputs of counter 173 are connected to the down and up inputs of counter 174, respectively. The counters 173, 174 provide a digital number on their output lines 175 which, as shown in FIG. 1, go to the digital to analog converter 19 and the computer interface 9. A clear pulse is provided on line 176 to set the counters to zero for initializing the circuitry.

Figure 6:
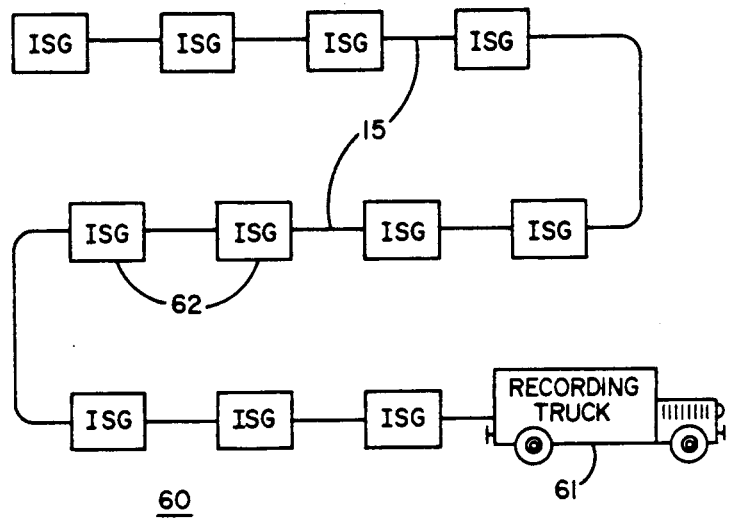
FIG. 6 is a block diagram of a plurality of geophone/transmitter units.
Figure 7:
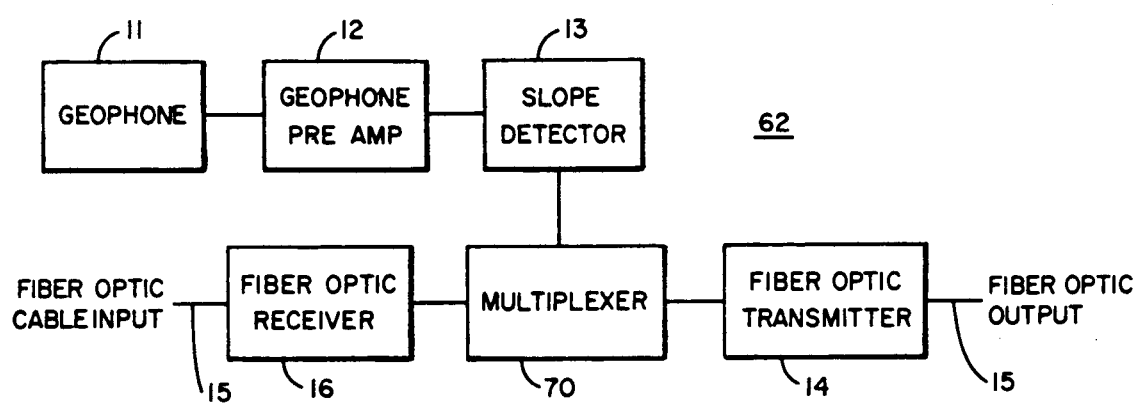
FIG. 7 is a block diagram of a typical one of the transmitters of FIG. 6 showing the multiplexing feature for multiple transmitters.

Seismic exploration using geophones normally covers a large area with each geophone detecting the seismic shock waves in a limited region. It is desired that the signal from each geophone be provided to a recording truck 61 (FIG. 6) over a multiplexed system 60 of individual seismic geophone receive/transmit systems (ISG) units 62 illustrated in FIG. 7. As seen in FIG. 7, a multiplexer unit 70 is used to provide a unique sequence number which would allow each unit 62 to place its digital data from the slope detector 13 into the bit stream at the appropriate time slice. Each slope detector would run continuously. The recording system would determine the sample rate, not the instantaneous slope detection geophone system. The instantaneous slope recording system of the invention would require only a single light-weight ruggedized fiberoptic cable 15. The cable would run between ISD stations and finally to the recording truck 61. One of the instantaneous slope geophone systems 62 would provide the necessary synchronization clocking for the multiplexed cable with each instantaneous slope geophone containing a unique number indicating its time slot.

Having described a preferred embodiment of the invention, numerous other variations will be apparent to those skilled in the art. It is felt, therefore, that this invention should not be limited in scope to the particular embodiment described above, but only by the spirit and scope of the following claims.

What is claimed is:

1. A signal transmission system comprising:
a source of an input electrical analog signal;
a transmitter comprising:
  means for providing a serial train of binary signal levels with changes in said binary signal levels corresponding to changes in slope of said input electrical analog signal;
  means, fed by said serial train for providing a binary transmit signal having a carrier frequency modulated by said serial train of binary signal levels;
a receiver;
transmission means for providing said transmit signal to said receiver;
said receiver comprising:
  means for detecting said binary transmit signal to provide a received binary signal;
  means connected to said detecting means and responsive to said received binary signal for providing a received output signal corresponding to changes in slop of said input electrical analog signal.

2. The system of claim 1 wherein said received output signal is an analog signal which has an amplitude change which corresponds to changes in slope of said input electrical analog signal.

3. The system of claim 1 wherein said received binary signal is a digital signal whose duration changes in accordance with changes in slope of said input electrical analog signal.

4. The system of claim 1 wherein:
said means providing a transmit frequency is a fiberoptic transmitter;
said transmission means is a fiberoptic cable; and
said means detecting said carrier frequency is a fiberoptic receiver.

5. The system of claim 1 wherein said means for providing a binary transmit signal having a carrier frequency modulated by said serial train includes a transmitter which provides a signal having a frequency adapted to be fed to a fiberoptic cable.

6. The system of claim 1 wherein said serial train of binary signal levels of said transmitter has periods which are unequal.

7. The system of claim 6 wherein said serial train of binary signal levels of said transmitter has a minimum period corresponding to the highest frequency of said analog signal.

8. The system of claim 1 wherein said means for providing a received output signal comprises:
  a clock pulse source providing a stream of clock pulses at its output;
  gating circuitry means, fed by the binary signal from said detecting means and fed by said stream of clock pulses, for providing an up count control signal and a down count control signal, selectively in accordance with the polarity of the binary signal and stream of clock pulses; and
  an up/down counter, fed by the stream of clock pulses, the up count control signal and the down count control signal to cause the counter to count up when the up count control signal is asserted and to count down when the down count control signal is asserted.

9. The system of claim 1 wherein said receiver comprising means for detecting said transmit signal comprises: a fiberoptic receiver adapted to receive a modulated carrier frequency signal from a fiberoptic cable and to provide said modulating frequency signal at its output.

10. The system of claim 8 wherein said receiver comprising said clock pulse source provides clock pulses at a repetition rate frequency whose period is substantially shorter than the shortest period of said binary signal.

* * * * *